United States Patent [19]
West et al.

[11] 3,718,539
[45] Feb. 27, 1973

[54] PASSIVE NUCLEAR REACTOR SAFEGUARD SYSTEM

[75] Inventors: John M. West, West Hartford, Conn.; William D. Fletcher, Arlington, Va.

[73] Assignee: Combustion Engineering, Inc., Windor, Conn.

[22] Filed: March 31, 1971

[21] Appl. No.: 129,724

Related U.S. Application Data

[63] Continuation-in-part of Ser. No. 730,719, May 21, 1968, abandoned.

[52] U.S. Cl..........................................176/37, 176/38
[51] Int. Cl. ...............................................G21c 15/18
[58] Field of Search............................176/37, 38, 87

[56] References Cited

UNITED STATES PATENTS

| | | |
|---|---|---|
| 3,115,450 | 12/1963 | Schanz ....................................176/38 |
| 3,253,996 | 5/1966 | Bond, Jr. et al. ........................176/37 |
| 3,423,286 | 1/1969 | Weems et al. ...........................176/37 |
| 3,431,168 | 3/1969 | Kjemtrup ................................176/38 |
| 3,248,298 | 4/1966 | Norman ..................................176/38 |

*Primary Examiner*—Benjamin R. Padgett
*Assistant Examiner*—Harvey E. Behrend
*Attorney*—Carlton F. Bryant, Eldon H. Luther, Robert L. Olson, John F. Carney, Richard H. Berneike, Lawrence P. Kessler and Stephen A. Scheeberger

[57] ABSTRACT

A safeguard system for a nuclear power plant is disclosed that incorporates means for containing the effects of a reactor accident to protect the environs of the plant against the release of harmful contaminants. The system includes particular containment structure housing the plant and a vapor suppression pool for condensing vaporous elements released from the plant. Various core cooling apparatus are integrated into the system to provide immediate and long term cooling of the reactor following a serious accident.

8 Claims, 5 Drawing Figures

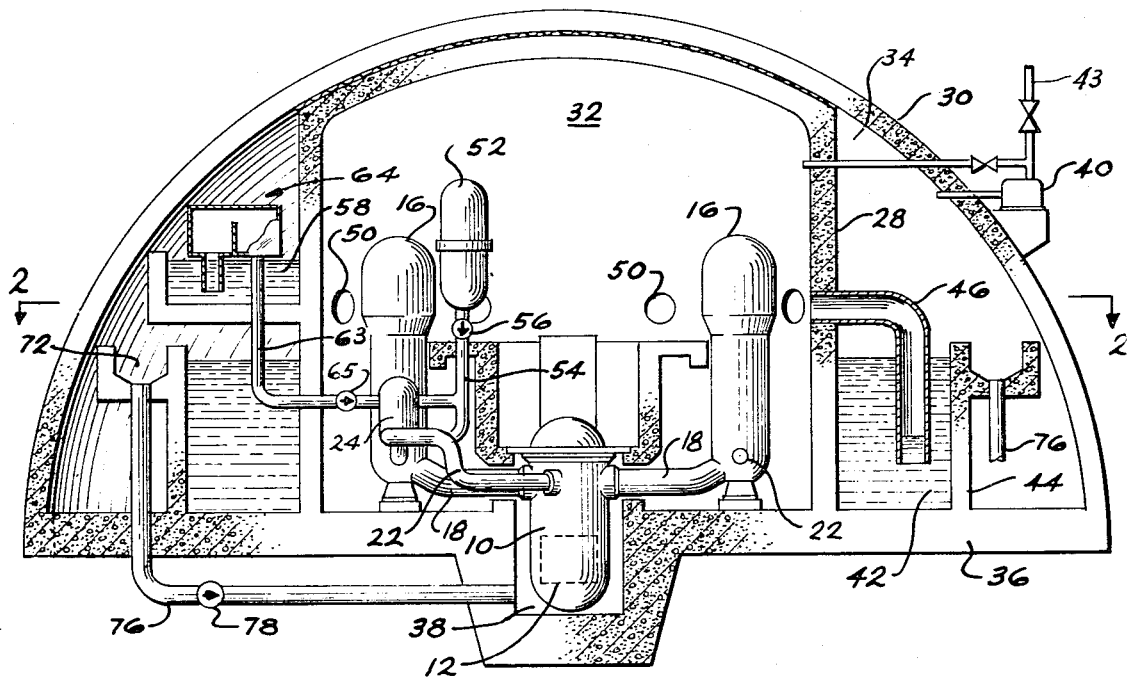
FIG-1
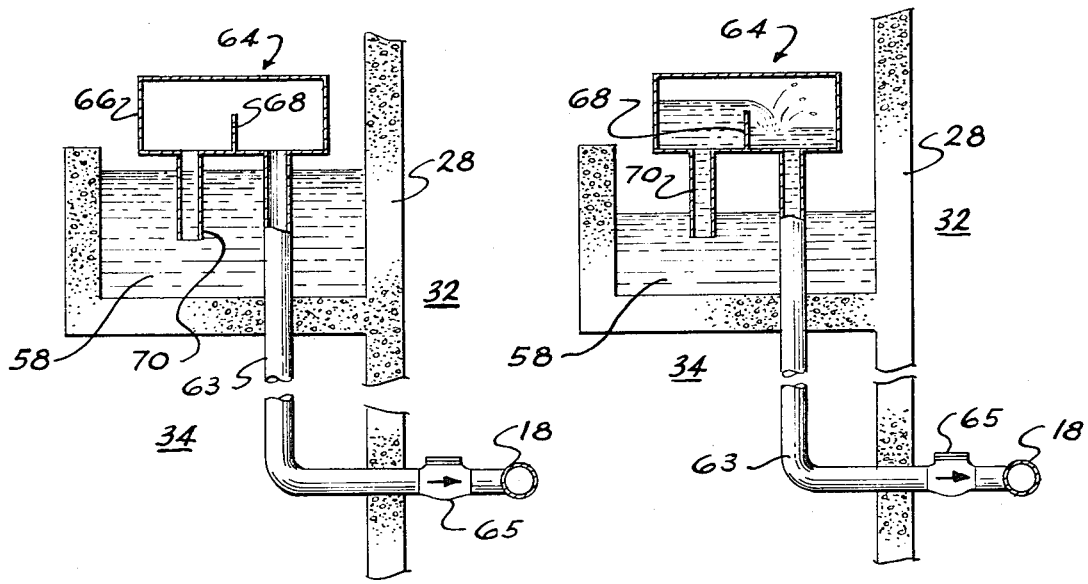
FIG-4
FIG-5

INVENTOR.
JOHN M. WEST
WILLIAM D. FLETCHER III
BY John F Carney
ATTORNEY

PASSIVE NUCLEAR REACTOR SAFEGUARD SYSTEM

This application is a continuation-in-part of U.S. Pat. application Ser. No. 730,719, filed May 21, 1968, now abandoned.

BACKGROUND OF THE INVENTION

The materials present in irradiated nuclear fuels, if liberated, are harmful to plant and animal life. In the event of a serious nuclear plant accident, release of these materials to the environment could have a harmful effect. A serious accident of the type contemplated would be perceived to be the rupture of a primary coolant flow line connected between the reactor and an associated vapor generator or rupture of the reactor vessel itself. Such accident could result in the emission from the reactor system of vaporous contaminants that, if released from the containment structure, could have an adverse effect on the environment. In order to minimize these effects means must be provided to contain plant emissions and also to remove the decay heat generated in the reactor by the fuel contained therein over an extended period of time.

In the past is has been proposed to prevent the release of harmful materials to the atmosphere by containing the reactor and its coolant system, including the vapor generators, in a containment structure that is designed to withstand the pressures that would be produced by the liberation of vapor and other gaseous fluids containing irradiated materials following the worst credible accident. In order to reduce the pressure of the released vaporous emissions it is common to provide apparatus for cooling the reactor system. Such apparatus are dependent upon external power for their actuation such that loss of external power to the plant would therefore render the safeguard system inoperative.

It is to the improvement of nuclear plant safeguard systems, therefore, that the present invention is directed.

SUMMARY OF THE INVENTION

According to the present invention there is provided an improved nuclear power plant safeguard system which, in one aspect, comprises a containment system including a first sealed containment structure that surrounds and forms the enclosure for the reactor vessel and its coolant system including the one or more vapor generators that comprise the vapor producing plant. A second sealed containment structure surrounds the first in spaced relation therefrom with the space between the two structures being evacuated to maintain a subatmospheric pressure therein during normal operation of the plant. The amount of space provided between the two structures represents a volume sufficient to receive and retain all of the non-condensible gases transferred to the space following the worst credible accident and yet maintain a pressure that is below atmospheric. In this way, leakage of harmful materials from the plant to its environs is prevented.

According to another aspect of the invention, a body of cooling liquid is contained within the evacuated space and operates to minimize the containment peak pressure following an accident. Vent ducts conduct vaporous emissions from the inner enclosure into the cooling liquid where the vapors are condensed. Non-condensable and insoluble gases are discharged from the liquid into the partially evacuated space.

According to still another aspect of the invention means are provided for dissipating reactor core decay heat over an extended period of time. Such means comprise any one or preferably all of the following core cooling means. First, a pressurized source of cooling liquid of limited capacity is connected to the primary coolant system and operative to inject its contents into the coolant system when the fluid pressure therein falls below the pressure established in the pressurized cooling liquid source. This component of the core cooling system is intended to provide cooling water immediately following a rupture or loss of coolant in the reactor system. Second, a separate source of cooling liquid is connected to the piping of the primary coolant system through a vacuum siphon which operates to pass core cooling liquid into the coolant system when the pressure within the evacuated space exceeds a predetermined amount. This apparatus will provide cooling liquid for the system for a period of up to about 24 hours following a plant accident. Thirdly, one or more catch tanks adapted to receive overflow from the liquid body are arranged to discharge the displaced liquid into heat exchange relation with the reactor in order to cool the same.

The discharge of cooling liquid from the various core cooling apparatus into the reactor system is passively operated; that is, actuation of the apparatus requires no external source of power nor electrical signals to initiate its operation. Thus the safeguard system cannot be rendered inoperative by loss of external power nor by malfunction of an actuating device. Instead, operation of the various apparatus is initiated immediately upon the occurrence of changes in conditions within the system, their actuation being automatically initiated through the use of energy inherent in the system.

DESCRIPTION OF THE DRAWINGS

FIG. 1 is an elevational section of a nuclear power plant embodying the safeguard system of the present invention;

FIGS. 4 and 5 are partial elevational sections illustrating another form of core cooling arrangement employed in the present safeguard system.

DESCRIPTION OF THE PREFERRED EMBODIMENT

Figure 2:
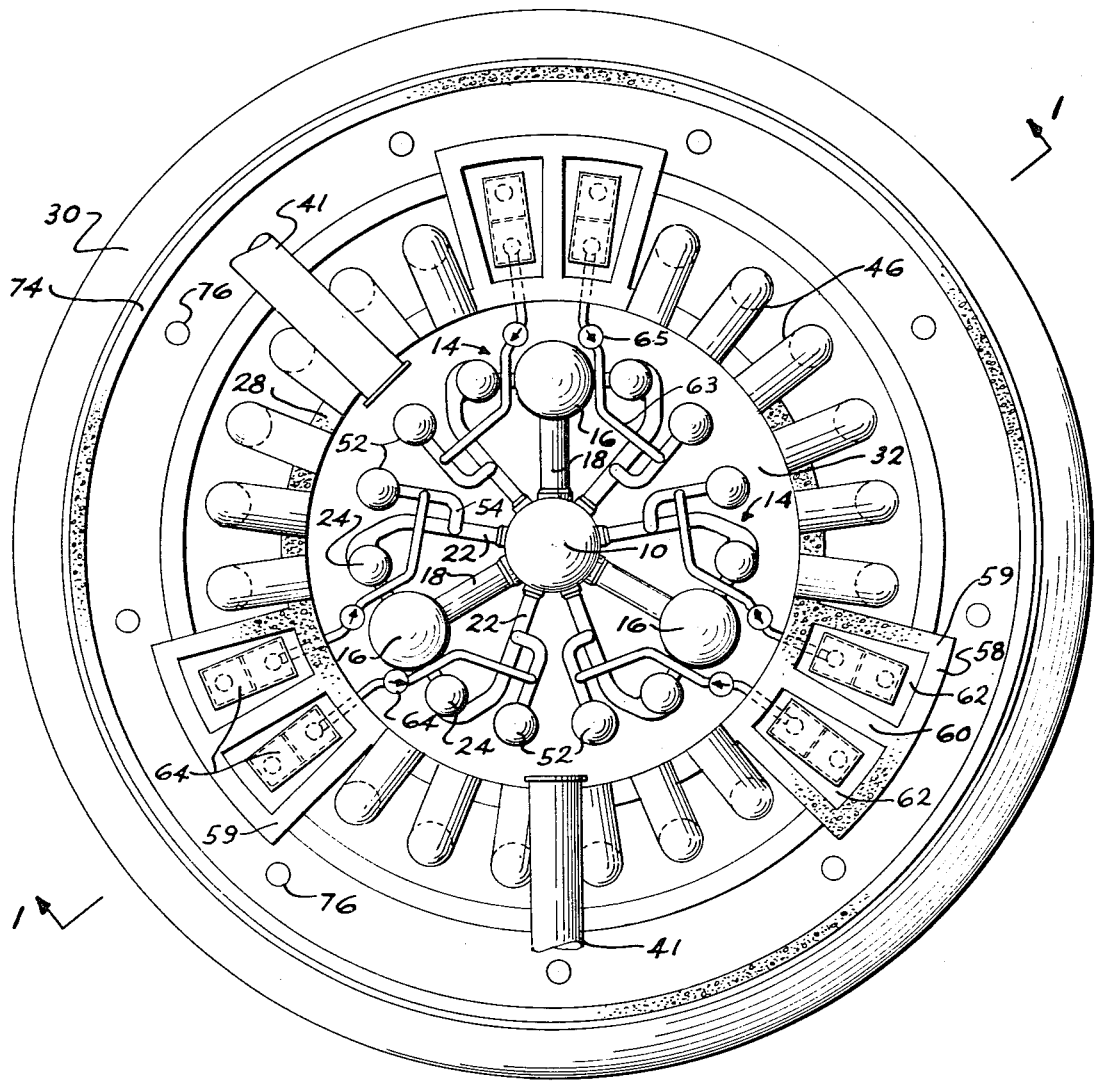
FIG. 2 is a transverse section taken along line 2—2 of FIG. 1.
Figure 3:
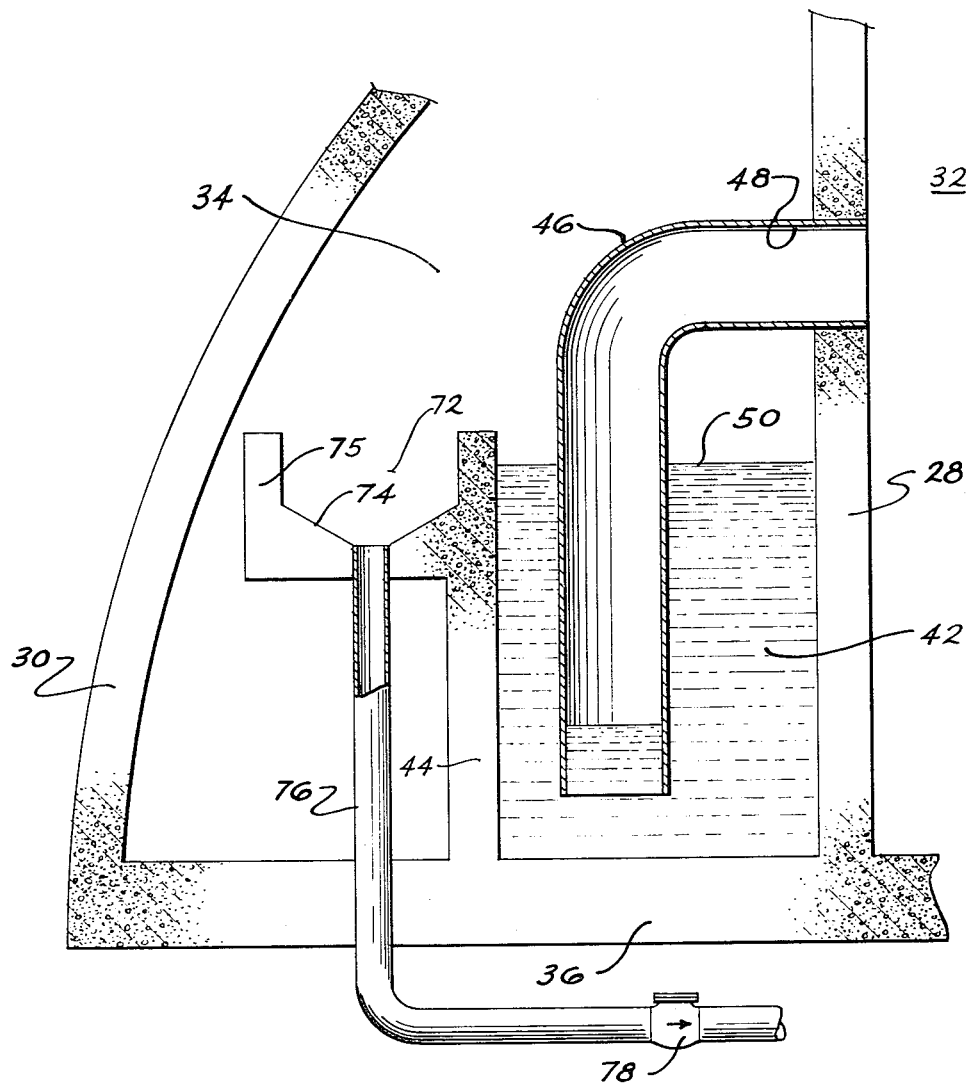
FIG. 3 is a partial elevational section illustrating in greater detail the catch tank arrangement employed in the present safeguard system.

Referring now to FIGS. 1 and 2 of the drawings, an illustrative example of a safeguard system according to the present invention is shown as being operative with a nuclear power plant. It is to be understood that, while the illustrated reactor plant is of the pressurized water type, the invention is equally well adapted for operation in nuclear plants of other types and that the following description is given by way of example only and is not intended to limit the invention.

The disclosed reactor plant comprises a neutronic reactor 10 containing an active portion or core 12 and three primary coolant circulating loops 14, although a greater or lesser number of loops can be employed as required. The three loops, as shown in FIG. 2 with their associated components and connected auxiliary systems, comprise the primary coolant system of the plant. In each of the three loops the primary coolant flow passes from the reactor 10 to the associated vapor generator 16 through a coolant supply line 18 with the spent coolant being returned to the reactor from the vapor generator through a pair of parallelly arranged return lines 22. Circulation of the primary coolant through the loop is effected by means of circulating pumps 24 disposed in each return line 22. A pressurizer (not shown) connects with the primary coolant system for the purpose of maintaining the coolant fluid in a pressurized, liquid state.

The safeguard system of the present invention includes a plant containment system comprising two mutually spaced containment or biological shielding structures 28 and 30 that surround the reactor plant. The inner structure 28 is shown as having a generally cylindrical wall and a domed roof defining a sealed enclosure chamber 32 within which the reactor 10 and the components of its coolant system are located. The outer structure 30 illustrated in the drawing as a sealed hemisphere surrounds the inner structure 28 and defines a space 34 therebetween. The bottom of the containment system is sealed by a floor 36 containing a well depression or sump 38 in which the reactor 10 is supported.

One or more evacuation pumps 40 are provided to place the space 34 under a partial vacuum of about 1 psia, the plant enclosure chamber 32 being normally maintained at atmospheric pressure and accessible from without by means of appropriately sealed personnel and equipment passages 41. By maintaining a partial vacuum in the space 34 between the containment structures 28 and 30, leakage to the exterior of the plant of harmful contaminant fluids that may be released within the interior of the chamber 32 is prevented. Because the space 34 is maintained at subatmospheric pressure a leak produced in the inner structure 28 will result in leakage into the evacuated space 34. On the other hand, a leak in the outer structure 30 will result in leakage from the plant exterior into the space 34. No leakage can thus occur from the containment system to the plant environment.

The partial vacuum in the evacuated space 34 is a stored vacuum in the sense that it is not dependent upon the continous operation of the evacuation pumps 40. A small amount of building leakage may exist during normal operation of the plant and will be compensated for by periodic operation of the pumps 40 which, during normal operation of the system, will discharge to atmosphere. However, the volume provided in the evacuated space 34 is sufficient to allow continued reactor plant operation for a long period of time without need of evacuation pump operation. As a result, continuous operation of the pumps 40 is not required and their removal from the system for maintenance or repair for a period of several days is permitted without danger of the vacuum within the space 34 decaying to a point requiring shutdown of the reactor plant.

Within the evacuated space 34 is disposed a body of cooling water 42 that operates to condense the vaporous products that are released into the enclosure chamber 32 in the event of a reactor plant accident and also to dissolve the soluble radioactive products entrained therein. By condensing the vaporous products of an accident the cooling water serves to minimize the peak containment pressure that would be experienced in the evacuated space 34 and also to rapidly reduce the containment pressure following an accident. As shown, the body of cooling water 42 is housed in an annular reservoir formed by tank 44 having upstanding walls and an open upper end. The tank 44 is mounted on the floor 36 in surrounding relation about the exterior of the inner containment structure 28. A plurality of fluid ducts 46 are provided to vent the enclosure chamber 32 conducting the fluids released in the chamber into the body of cooling water 42 where the vapors will be condensed. The non-condensible and insoluble matter contained in the released fluids are permitted to be discharged into the evacuated space 34. The ducts 46 are circumferentially spaced about the inner containment structure 28 and have their inlet ends communicating with the chamber 32 through openings 48. The discharge ends of the ducts are disposed well below the level 50 of the liquid body in order to establish an effective water seal between the enclosure chamber 32 and the evacuated space 34 that prevents flow from the chamber to the space during normal operation.

Also included in the instant reactor plant safeguard system are means for cooling the reactor core in the event of a plant accident. These means include a plurality of high pressure injection tanks 52 that each contain a body of cooling liquid maintained under a relatively high fluid pressure of from about 300 psia to 1,200 psia. In the disclosed arrangement an injection tank 52 is provided for communication with each of the return lines 22 in each primary coolant loop 14, communication being effected by means of lines 54 containing check valves 56 connecting the return lines with the respective tanks. Although the tanks 52 are here shown as occupying an elevated position within primary enclosure chamber 32 they could alternatively occupy other positions within the evacuated space 34. Cooling liquid contained in the respective tanks is discharged into the affected coolant loop 14 once the fluid pressure in that loop drops below the pressure head at the check valve 56 as will occur in the event of an accident resulting in the release of fluid from the coolant loop. In the illustrated arrangement, with tanks 52 being disposed about 60 feet above the check valves 56 and being pressurized an amount from about 300 psia to 1,200 psia, discharge of cooling liquid into the coolant piping will occur when the pressure in the line drops from about 2,250 psia, which is normal system operating pressure, to within about 22 psia of the pressure in the tanks 52 as will occur normally within a few seconds after occurrence of a rupture of serious proportions. The tanks 52 are sufficiently large to contain enough cooling liquid to fill the reactor vessel to a level above the top of the reactor core and thus to remove decay heat from the reactor until the coolant system is depressurized, which will occur in a period of about 5 minutes or less following the accident.

The core cooling system further includes a plurality of cooling water reservoirs 58, one such being operatively associated with each of the three primary coolant loops 14 in the disclosed system. Each reservoir 58 is formed of an open-topped tank 59 disposed in an elevated position in the evacuated space 34 and having a center wall 60 that divides the tank into separate chambers 62 that are each operatively associated with one return line 22 of each primary coolant loop. The chambers 62 are open at the top and contain a significantly greater amount of cooling liquid than the tanks 52. The liquid from these sources is such as will be capable of sustaining effective core cooling for up to about 24 hours following a serious accident. As shown, the chambers 62 connect with the respective coolant loops through lines 63, containing check valves 65. A vacuum siphon 64 is disposed within each chamber 62 to operate in the lines 63 to discharge cooling liquid from the chamber into the associated line when the pressure within the evacuated space 34 rises a predetermined amount. In the illustrated arrangement the siphons 64 are arranged to pass liquid from the chambers 62 into the lines 63 when the pressure in the evacuated space rises a predetermined amount, about 5 psi for example, about normal operating pressure. The siphon 64 comprises a closed tank 66 having an internal transverse partition 68 that extends to a level spaced from the top of the tank. On one side of the partition 68 a conduit 70, open at its bottom, extends into the body of liquid retained in the reservoir and operates to conduct liquid to the tank interior. The line 63 connects with the bottom of the tank on the other side of the partition and operates to conduct liquid from the tank to a point of use as hereinafter described.

The operation of this portion of the core cooling system is described with reference to FIGS. 4 and 5. Under normal operating conditions and pressure within the siphon tank 66 is the same as the subatmospheric pressure in the evacuated space 34, and thus as shown in FIG. 5 the liquid level will be well below the upper edge of partition 68 such that no liquid will be contained in line 63. As the pressure within the evacuated space 34 increases, the cooling liquid in the chamber 62 will rise into the tank 66 until it spills over the upper edge of the partition 68 and thence into line 63, filling the line. No discharge of the cooling liquid into the reactor coolant piping will occur, however, until such time as the internal pressure in the reactor piping falls below a value equal to or less than the pressure head on the column of cooling liquid in line 63 whereupon the check valve 65 opens to discharge cooling liquid into the coolant system. With the chambers 62 being located about 60 feet above the check valve 65, the latter will be caused to open when the coolant system is depressurized to about 30 psia.

According to the present invention the disclosed safeguard system further incorporates additional means for supplying cooling liquid to remove decay heat from the reactor. This means comprises an annular trough 72 surrounding the cooling liquid pool 42 and defining a catch tank for collecting the overflow from the pool as hereinafter more fully described. As shown the trough 72 includes an annular bottom wall 74 formed of downwardly converging members and an upstanding side wall 75 radially outwardly spaced from the uppermost portion of the wall 44 that defines the retention structure for the liquid body 42, the latter being common to both the retention structure and the trough. A plurality of circumferentially spaced pipes 76 connect at one end with the bottom wall 74 of the trough 72 and at their other end with the reactor sump 38. A check valve 78 is contained in each pipe 76 to prevent reverse fluid flow from the sump 38 to the catch tank.

The association of the catch tank trough 72 with respect to the liquid pool 42 is such as to cause any liquid that is displaced from the pool over the upper edge of the retention wall 44 thereof to be collected in the trough and thereby become available as a cooling medium to remove decay heat from the reactor. As shown in the illustrated embodiment the collected liquid is conducted from the catch tank to its point of use by means of the pipes 76.

Cooling liquid is caused to be discharged from the liquid pool 42 into the catch tank 72 initially by the surge of air and vaporous fluids that are conducted from the plant enclosure 32 into the pool by the vent ducts 48 immediately following an accident that results in the release of pressurized fluid from the reactor system. Following the initial surge of liquid into the catch tank continued overflow caused by the continued condensation of the vaporous fluids that are conducted into the pool through the ducts 48 will be collected by the catch tank and passed into heat exchange relation with the reactor to remove the decay heat therefrom. Also contributing to the continued overflow of liquid from the pool is the expansion that occurs in the liquid body as it absorbs heat from the fluid entering it from the ducts 48.

It should be apparent that, although the pipes 76 that emanate from the trough 72 are shown as connecting with the reactor sump 38, the pipes alternatively be arranged to supply cooling liquid into the coolant return lines 24 or to other areas of the plant that may be subject to overheating following a plant accident.

The operation of the herein described nuclear plant safeguard system is as follows. Following a rupture in the primary coolant system, the pressure in the inner enclosure chamber 32 will increase at a rate of up to 10 to 20 psi per second depending on the size of the rupture and the volume of the chamber. As soon as the pressure starts to rise, air will flow through the vent ducts 46 from the enclosure chamber into the stored water pool 42. If the rupture is large the peak pressure in the chamber 32 will be reached in about 2 seconds and then drop off rapidly. Within a short period of time (less than 5 seconds) most of the air will be forced from the enclosure chamber 32 into the pool and thence into the evacuated space 34. As this occurs, some of the water or other cooling liquid contained in the pool 44 will be displaced into the catch tank 72 from whence it will flow through pipes 76 into the reactor sump 38 or, alternatively, to elsewhere in the system. At the same time, vapor generated by venting of the reactor coolant system will fill the containment building and also flow through the ducts 46 into the stored water pool 42. This vapor will be condensed by the stored water causing further overflow into the trough 72. The ducts 48 from the enclosure chamber 32 to the pool are large enough to allow vapor to flow into the stored water as fast as it is released during venting of the coolant system.

A partial vacuum will exist at all times in the evacuated space 34 due to the amount of volume presented thereby. The pressure in the space immediately following the worst credible accident and conservatively assuming that all the air in the enclosure 32 is transferred to the space 34 will, in a typical case, be about 4 psia below atmospheric pressure. The volume of the evacuated space is large enough so that the vacuum pumps 40 can be inoperative when an accident occurs and even then, 1 or more weeks will be required before the pressure in the evacuated building approaches atmospheric pressure. Because of the presence of a vacuum in the space 34 no leakage of harmful elements to the atmosphere can occur. When the pressure in the space 34 approaches atmospheric pressure, the vacuum pumps 40 can be started. The pumps 40, as shown, discharge into the enclosure chamber 32 so that it will be several months before any discharge from the evacuated space 32 to the atmosphere is required.

The cooling liquid stored in the water pool 42 is sufficient to absorb all of the energy released during the course of a maximum credible accident plus the decay heat released from the reactor for a specified time after the accident, such as 24 or more hours. Cooling coils (not shown) can be installed in the stored water pool 42 so that when the heat sink provided by the water is exhausted after the accident, and electric power is again available, heat can be removed by the cooling coils to allow additional decay heat removal for an indefinite period of time.

Following a rupture in the primary coolant system, as manifest by a reduction of pressure in the coolant system, core cooling water is released from the pressurized injection tanks 52 as soon as the coolant pressure falls to within approximately 22 psi of the pressure in the tanks since this will occasion the opening of the check valves 56. Core cooling from this source of cooling liquid is capable of continuing until the coolant system is depressurized, a period of about 5 minutes or more following a rupture of serious proportions, whereupon the discharge of cooling liquid will then be undertaken by the vacuum siphon apparatus 64. This apparatus is effective to pass cooling liquid from the reservoirs 58 to the lines 63 as soon as the pressure within the evacuated space 34 is increased about 5 psi. The capacity of the space 34 is such that a 5 psi increase in pressure will occur well before the reactor coolant system is depressurized. When depressurization of the coolant system occurs, check valves 65 open to release cooling liquid from the siphon tanks 66 to the coolant system. Ideally, the amount of cooling liquid retained in the reservoirs 58 is sufficient to sustain cooling for up to about 24 hours.

Immediately following a major rupture in the reactor coolant system cooling liquid overflowing from the liquid body 42 into the catch tank 72 flows through pipes 76 to enter the reactor sump 38 and immerse the reactor vessel 10. If the rupture occurred in the vessel, this cooling liquid will then be caused to enter the vessel through the rupture thereby to submerge the core 12 and provide cooling thereof by evaporation. As the cooling liquid evaporates, it flows through the vent ducts 46 to the liquid body where it condenses. When the vaporized cooling liquid condenses in the liquid body the level therein rises to effect more overflow into the catch tank 72 from whence the liquid flows back to the reactor sump 38. An automatic recirculating system is thereby achieved which will continue to operate until the temperature of the liquid body 42 rises to such a point as to be ineffective as a condensing medium without the addition of externally powered cooling means.

For maintaining redundant reactor core cooling for extremely long periods of time it is contemplated to employ external means which may include the following. Means including a pump and a heat exchanger can be provided to circulate cooling liquid from the reactor sump 38 back into either the pressurized tanks 52 or reservoirs 58 to provide additional cooling capability for these portions of the safeguard system. Alternatively, cooling liquid can be supplied from an external source to either the tanks 52 or reservoirs 58.

For maintaining containment building integrity for extended period of time externally operated cooling coils can be employed to remove heat from the stored liquid body 42 and thereby rejuvenate the heat sink. At the same time, vacuum pumps 40 can be operated to maintain a partial vacuum in the evacuated space 34 by discharging into the enclosure chamber 32, thus to eliminate the need to discharge harmful elements exteriorly of the containment structure for several weeks or months.

It will therefore be evident that a plant safeguard system constructed according to the disclosed invention will have the following desirable capabilities;

a. Leakage from the containment building during normal plant operation and after the occurrence of an accident of serious proportions is prevented.

b. The containment system including the core cooling system is completely passive and will operate automatically independent of sources of power and actuation signals.

c. The suppression of released vapor by the condensation thereof in the stored water pool minimizes the peak pressure experienced within the containment structure during an accident and rapidly reduces containment pressure following an accident.

d. No operator action of any kind is required for a long period of time following an accident. Therefore, a substantial period of time exists to evaluate the accident situation, to allow the decay of radioactive materials, and to provide external power.

e. Core cooling can continue after the passive systems have been exhausted by supplying cooling liquid to the system and electrical power to the vacuum pumps. These operations do not require entry of personnel into the containment system. After these services are provided, the reactor plant would require little or no attention for an indefinite period of time.

f. Following an accident a partial vacuum will exist in the evacuated space. This partial vacuum will continue to exist for many hours, possibly many days, without the need of vacuum pump operation. By operating the vacuum pumps such that they discharge to the enclosure chamber the partial vacuum can be maintained for a long period of time, possibly months, before it would be necessary to discharge to the atmosphere.

g. The system does not require apparatus dependent upon external power for operation or actuation such that a loss of external power cannot render the system inoperative.

It will be understood that various changes in the details, materials, and arrangements of parts which have been herein described and illustrated in order to explain the nature of the invention may be made by those skilled in the art within the principle and scope of the invention as expressed in the appended claims.

What is claimed is:

1. A safeguard system for a nuclear reactor plant including a reactor, at least one vapor generator operatively connected to said reactor and a containment structure sealedly enclosing said reactor and vapor generator, said safeguard system including:
   a. a body of cooling liquid disposed externally of said containment structure;
   b. duct means operative to conduct fluids liberated within said containment structure to said body of liquid, said duct means having its inlet end in open communication with the interior of said containment structure and its outlet end submersed in said body of cooling liquid;
   c. means forming a catch tank disposed adjacent to said cooling liquid body and arranged to receive liquid overflow therefrom; and
   d. tube means connecting with said catch tank for conducting overflow liquid received thereby into heat exchange relation with said reactor.

2. Apparatus as recited in claim 1 wherein said body of cooling liquid is retained in a tank having an upstanding wall and an open top and wherein said catch tank comprises wall means forming a trough that is generally rectangular in section, said wall means including one wall that is common in with the upstanding wall of said cooling liquid retention tank.

3. Apparatus as recited in claim 2 wherein said containment structure includes a pair of concentrically spaced substantially sealed enclosures, said reactor and associated vapor generators being contained within the inner of said enclosures and said body of cooling liquid and said catch tank is contained in the intermediate space between said enclosures.

4. Apparatus as recited in claim 3 wherein said cooling liquid retention tank and said catch tank are annular members disposed in surrounding relation to said inner enclosure.

5. Apparatus as recited in claim 4 including means for maintaining the pressure within said intermediate space at subatmospheric levels.

6. Apparatus as recited in claim 5 including means for supplying cooling liquid for the removal of decay heat from said reactor, said means comprising:
   a. a source of cooling liquid for supplying liquid to said reactor plant at a pressure greater than atmospheric;
   b. conduit means connecting said source to the primary coolant system of said reactor; and
   c. check valve means disposed in said conduit means and arranged to open when the pressure in said primary coolant system is reduced to a level below the fluid pressure in said conduit means upstream of said check valve means.

7. Apparatus as recited in claim 6 wherein said source of cooling liquid comprises a closed tank and includes means for pressurizing the contents of said tank to a fluid pressure less than the normal operating pressure of said primary coolant system but greater than atmospheric pressure.

8. Apparatus as recited in claim 6 wherein said source of cooling liquid comprises tank means disposed in said intermediate space and in open communication therewith and including vacuum siphon means operatively connected to said tank means for supplying cooling liquid to said conduit means when the pressure in said intermediate space increases a predetermined amount.

* * * * *